(No Model.) 2 Sheets—Sheet 1.

A. WINTON.
BICYCLE.

No. 553,378. Patented Jan. 21, 1896.

Witnesses
Geo. E. Frech
James W. Beran

Inventor
Alexander Winton
per Pattison & Nesbit
Attorneys (No Model.) 2 Sheets—Sheet 2.

A. WINTON.
BICYCLE.

No. 553,378. Patented Jan. 21, 1896.

Witnesses
Geo. E. Frech
James N. Berard

Inventor
Alexander Winton
per Pattison & Nesbit
Attorney

UNITED STATES PATENT OFFICE.

ALEXANDER WINTON, OF CLEVELAND, OHIO.

BICYCLE.

SPECIFICATION forming part of Letters Patent No. 553,378, dated January 21, 1896.

Application filed October 11, 1894. Serial No. 525,617. (No model.)

*To all whom it may concern:*

Be it known that I, ALEXANDER WINTON, of Cleveland, in the county of Cuyahoga and State of Ohio, have invented certain new and useful Improvements in Bicycles; and I do hereby declare the following to be a full, clear, and exact description of the invention, such as will enable others skilled in the art to which it pertains to make and use it, reference being had to the accompanying drawings, which form part of this specification.

My invention relates to improvements in bicycles; and it consists in certain novel features of construction respecting the manner of attaching the crank and sprocket-wheel with the crank-shaft, which will be fully described hereinafter, and especially pointed out in the claim.

When detaching cranks and the sprocket-wheel from the crank-shaft of a bicycle, where they are attached in the usual manner by a key having one end screw-threaded to receive a nut, it is necessary to remove the nut and drive the key from its wedged position by hammering, which is injurious to the bearing of the crank-shaft and defaces the part receiving the blow. In order to hold the crank and sprocket rigid to their shaft they are very tightly fitted by the manufacturer, so that it is ordinarily impractical for a rider to detach the crank or sprocket-wheel, and especially on the road, should it become desirable for any reason to do so—as, for instance, straightening a crank. The greatest inconvenience, however, is occasioned from the fact that the bearings of the crank are practically inaccessible to the rider for the purpose of cleaning, which is so essential to the easy running and durability thereof.

The object of my invention is to so construct the attachment of the crank and sprocket-wheel to their shaft that the rider can at any time quickly and readily detach either crank or the sprocket-wheel from its shaft without any hammering or defacing of any of the parts, either for the purpose of repair or to enable ready access to the bearings thereof, and yet produce a simple, strong, and rigid construction, all of which is very desirable in the construction of bicycles, and at the same time to make a construction very much neater in appearance, and which construction enables me to use a lighter sprocket-wheel without sacrificing any of its strength.

My invention is illustrated in the accompanying drawings, in which—

Figure 1:
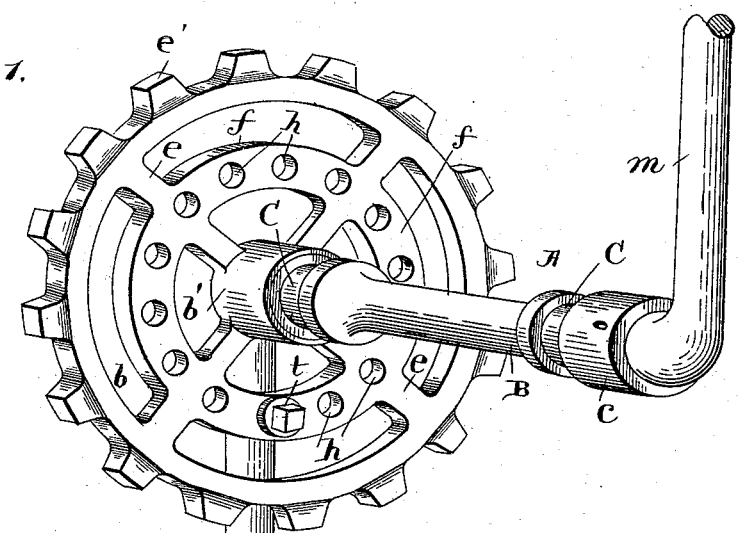
Figure 2:
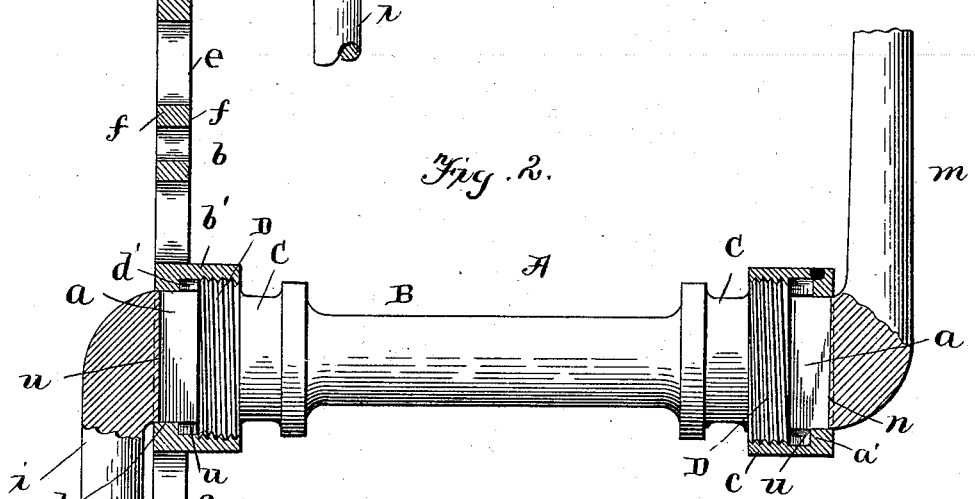
Figure 6:
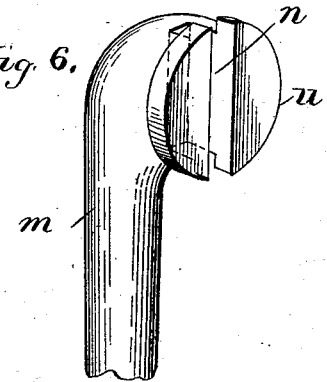
Figure 3:
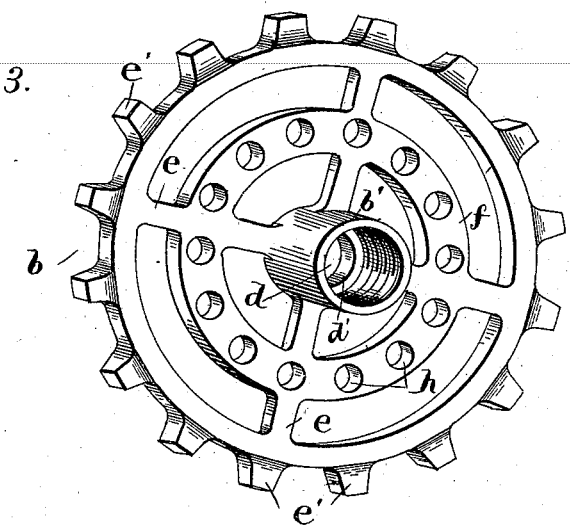
Figure 4:
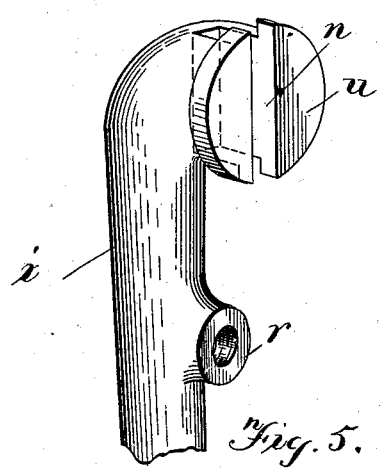
Figure 5:
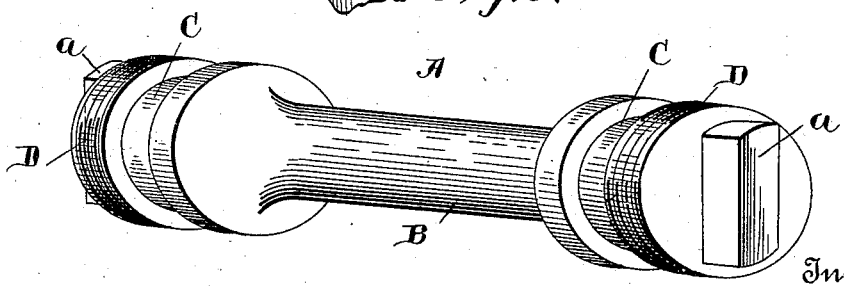

Figure 1 is a perspective view of a crank-shaft with the cranks and sprocket-wheel attached and the pedals omitted. Fig. 2 is a sectional view taken longitudinally through the crank-shaft, showing my invention complete. Fig. 3 is a detached perspective view of the inside of the sprocket-wheel. Fig. 4 is a similar view of the crank attached to the sprocket-wheel end of the shaft. Fig. 5 is a perspective view of the shaft without the cranks and the sprocket-wheel. Fig. 6 is a similar view of the crank at the opposite end of the shaft from the sprocket-wheel.

Reference being had to the drawings, A designates the crank-shaft having the usual intermediate reduced portion B and the roller grooves C, but which may be varied at will without affecting my invention. Each end of the shaft just outside of the said bearing C is provided with the external screw-threaded portion D and the projection or lip $a$.

The sprocket-wheel $b$ is provided with an inwardly-projecting flange $b'$ around its central opening $d$, and this flange is screw-threaded internally, as clearly illustrated. The wheel is preferably of the spider fashion—that is, with radially-extending arms $e$ carrying at their outer ends the toothed portion $e'$ for the purpose of lightness, and an intermediate circular portion $f$ having a series of perforations $h$, one or more of which are primarily for the mechanical purpose to be fully set forth hereinafter, and all of which are secondarily for the purpose of lightness.

The inner end of the cranks $i\ m$ are each provided with the slots or openings $n$ for the reception of the projections or lips $a$ formed on the ends of the crank-shaft A, thus interlocking them firmly together against independent rotary movement, and a surrounding laterally-extending flange $u$ immediately at the inner end of the crank, as shown, for holding the members together, as will fully appear farther on. The ends of the cranks are held to the ends of the shaft by means of the sleeve $c$ and the flange of the sprocket-wheel, as clearly shown in Fig. 2, and which will be specifically referred to hereinafter.

The sprocket-wheel crank $i$ is provided with a slight projection $r$ on its inner side, which is provided with a screw-threaded perforation $s$ for the reception of a headed screw $t$, which passes through one of the perforations $h$ of the sprocket-wheel, thus locking the sprocket-wheel and the crank firmly and directly together. The series of openings $h$ serve the mechanical purpose of enabling the sprocket-wheel to be screwed with more or less tightness upon the end of the shaft, and, secondarily, for the purpose of lightness. This arrangement, as will be clearly conceived, relieves the sprocket-wheel of all central circumferential strain which is present in the usual construction of locking the sprocket-wheel to the shaft through the medium of a key and receiving its power or strength directly from the crank-shaft, which is the usual construction. In my construction the circumferential strain is only from the perforated circular portion $f$, which is near the periphery of the wheel, thus enabling me to make the wheel inside of this circular portion very light and the outer portion lighter than usual, owing to the approximate direct application of the power to the circumference thereof in contradistinction to applying the power from the center thereof.

The surrounding laterally-extending flange $u$ of the crank $m$ is clamped between the end of the crank-shaft and the inwardly-extending flange $a'$ of the sleeve $c$, and the same flange of the crank $i$ is clamped between the opposite end of the shaft and the inwardly-extending flange $d'$ at the outer end of the flange or hub of the sprocket-wheel, as clearly illustrated in Fig. 2.

In order to permit the cranks to pass through the sleeves which hold them when placed in position, the outer bend or curve of the crank is formed, as shown, on an arc of a circle not exceeding the arc described by the bend or curve when carrying the crank outward for the purpose of removal from or inward for the purpose of placing it in the sleeve.

By reference to Fig. 1 it will be seen that in appearance the crank-shaft and the cranks are composed of a single piece, thus making a very neat as well as a convenient and rigid construction.

I desire to call attention to the fact that while I prefer to use the construction shown and described it may be reversed without departing from the spirit of my invention, in that instead of making the ends of the shaft screw-threaded the inturned ends of the cranks may be provided with a threaded portion, the sleeve $c$ and the flange $d'$ of the sprocket-wheel being reversed and the ends of the shaft provided with laterally-extending flanges similar to those upon the inner ends of the cranks.

Having thus fully described my invention, what I claim as new, and desire to secure by Letters Patent, is—

In a bicycle, a crank shaft and a detachable crank therefor having interlocking ends, a sprocket wheel uniting said crank and shaft by rotation and provided with a series of openings formed on the arc of a circle drawn from the center of said wheel, and a lock adapted to pass through any one of said openings and engage the crank for the purpose described.

In testimony whereof I affix my signature in presence of two witnesses.

ALEXANDER WINTON.

Witnesses:
JOHN A. LEFKER,
JOS. J. DUNN.